United States Patent
Bishop

(10) Patent No.: US 9,091,863 B2
(45) Date of Patent: Jul. 28, 2015

(54) SYSTEM FOR VIBRATING OPTICAL COMPONENTS USING AN AIRFLOW DEVICE

(71) Applicant: CHRISTIE DIGITAL SYSTEMS USA, INC., Cypress, CA (US)

(72) Inventor: Michael Bishop, Kitchener (CA)

(73) Assignee: CHRISTIE DIGITAL SYSTEMS USA, INC., Cypress, CA (US)

( * ) Notice: Subject to any disclaimer, the term of this patent is extended or adjusted under 35 U.S.C. 154(b) by 86 days.

(21) Appl. No.: 13/923,421

(22) Filed: Jun. 21, 2013

(65) Prior Publication Data

US 2014/0375963 A1 Dec. 25, 2014

(51) Int. Cl.
G03B 21/18 (2006.01)
G02B 27/48 (2006.01)
G03B 21/20 (2006.01)
G02B 21/14 (2006.01)

(52) U.S. Cl.
CPC ............... *G02B 27/48* (2013.01); *G02B 21/14* (2013.01); *G03B 21/2033* (2013.01)

(58) Field of Classification Search
CPC ..... H04N 9/315; H04N 9/3197; G03B 21/14; G03B 21/2033; G02B 27/48

USPC .......... 353/31, 37, 38, 52, 57, 60, 85, 94, 99; 372/20, 40, 70, 75, 99, 100, 102; 385/50, 96, 115, 116, 119, 146; 356/28, 28.5, 450, 519
See application file for complete search history.

(56) References Cited

U.S. PATENT DOCUMENTS

| | | | | |
|---|---|---|---|---|
| 5,299,222 | A * | 3/1994 | Shannon et al. | 372/75 |
| 5,765,934 | A * | 6/1998 | Okamori et al. | 353/94 |
| 6,078,714 | A * | 6/2000 | Cavanaugh | 385/115 |
| 6,224,216 | B1 * | 5/2001 | Parker et al. | 353/31 |
| 8,294,982 | B2 * | 10/2012 | Her | 359/341.1 |
| 2008/0008431 | A1 * | 1/2008 | Shikii et al. | 385/115 |

* cited by examiner

*Primary Examiner* — Sultan Chowdhury
(74) *Attorney, Agent, or Firm* — Perry + Currier, Inc.

(57) ABSTRACT

A system for vibrating optical components using an airflow device is provided. The system includes: one or more elongated fibers, each of the one or more elongated fibers comprising a respective diameter; one or more optical components for at least one of conveying coherent light and interacting with the coherent light; and, an airflow device arranged to flow air over, and about perpendicular to, the one or more elongated fibers at a velocity, a combination of the respective diameter of each of the one or more elongated fibers and the velocity of the air configured to cause the one or more elongated fibers to produce shedding vortices that cause the one or more elongated fibers and the one or more optical components to each vibrate.

21 Claims, 9 Drawing Sheets

SYSTEM FOR VIBRATING OPTICAL COMPONENTS USING AN AIRFLOW DEVICE

FIELD

The specification relates generally to optical fibers, and specifically to a system for vibrating optical components using an airflow device.

BACKGROUND

Coherent light sources, such as lasers, are attractive light sources for projection displays; however coherent light produces image defects in projected images, including speckle and non-uniformities. Optical fibers can be used to convey light from the coherent light sources to a light modulator. While vibration of the optical fibers can be used to reduce the image defects, previously used mechanical shakers, such as shakers, motors, offset shafts, piezo-electrics, are complicated and can lead to damage of the optical fibers. Similar effects can be produced by vibrating optical components interacting with coherent light, with damage again possibly occurring when mechanical shakers are used.

SUMMARY

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

An aspect of the specification provides a system comprising: one or more elongated fibers, each of the one or more elongated fibers comprising a respective diameter; one or more optical components for at least one of conveying coherent light and interacting with the coherent light; and, an airflow device arranged to flow air over, and about perpendicular to, the one or more elongated fibers at a velocity, a combination of the respective diameter of each of the one or more elongated fibers and the velocity of the air configured to cause the one or more elongated fibers to produce shedding vortices that cause the one or more elongated fibers and the one or more optical components to each vibrate.

Each of the one or more elongated fibers can comprises a respective one of the one or more optical components, each of the one or ore optical components can comprise a respective optical fiber.

The one or more optical components can be attached to a respective one of the one or more elongated fibers, and the shedding vortices can cause the one or more elongated fibers to vibrate which in turn causes the one or more optical components to vibrate.

The one or more optical components can be located in a wake of the shedding vortices.

Each of the one or more optical components can comprises one or more of a diffuser, a fly's eye lens and a lenslet array.

A combination of the respective diameter of each of the one or more elongated fibers and the velocity of the air can cause the one or more elongated fibers and the one or more optical components to each vibrate near a respective shedding frequency due to the shedding vortices.

A combination of the respective diameter of each of the one or more elongated fibers and the velocity of the air can have a Reynolds number of greater than about 50.

The respective diameter of each of the one or more elongated fibers and the velocity of the air can meet a condition of St*V/D≥100 Hz, where V is the velocity of the air, D is the respective diameter of each of the one or more elongated fibers, St is the Strouhal number, and 100 Hz is a shedding frequency. The one or more elongated fibers can be generally cylindrical and a Strouhal number can be about 0.21.

The respective diameter of each of the one or more elongated fibers can be in a range of about 1 mm to about 3 mm, and the velocity can be about equal to or greater than about 2 m/s.

A temperature of the air can be greater than about 15° C.

Boundary conditions of each of the one or more elongated fibers can be configured to control an amplitude of vibration of each of the one or more elongated fibers. The system can further comprise at least two respective retainers for each of the one or more elongated fibers, wherein the boundary conditions can comprise one or ore of a length of each of the one or more elongated fibers between respective retainers for each of the one or more elongated fibers, and a tension of each of the one or more elongated fibers between the respective retainers. The amplitude of vibration of each of the one or more elongated fibers can be about a same as the respective diameter of each of the one or more elongated fibers.

The system can further comprise two respective retainers for retaining each of the one or more elongated fibers, and a respective ratio of a respective distance between each of the two respective retainers and a diameter of a respective elongated fiber can be greater than about 2:1.

The system can further comprise: an array of elongated fibers including the one or more elongated fibers, arranged parallel with each other; and, a plurality of optical components, including the one or more optical components, in a one-to-one relationship with the array of elongated fibers, the airflow device arranged to flow the air over, and about perpendicular to the array of elongated fibers. The system can further comprise a variable pressure device located between the airflow device and the array of elongated fibers, the variable pressure device configured to produce a gradient in the velocity of the air from the airflow device as the air flows over the array of elongated fibers, so that a frequency of vibration of each of the elongated fibers in the array, and each of the plurality of optical components, varies across the array. The variable pressure device can comprises a variable pressure drop mesh.

The air device can comprise one or more of a fan, a cooling, and a blower.

The system can further comprise a cabinet housing the airflow device and at least a portion of the one or more elongated fibers. The airflow device can comprises a cooling fan for the cabinet. The system can further comprise an exhaust in the cabinet for the air to flow past the one or more elongated fibers.

A further aspect of the specification provides a system comprising: one or more optical fibers, each of the one or more optical fibers comprising a respective diameter; and, an airflow device arranged to flow air over, and about perpendicular to, the one or more optical fibers at a velocity, a combination of the respective diameter of each of the one or more optical fibers and the velocity of the air configured to cause the one or more optical fibers to produce shedding vortices that cause the one or more optical fibers to vibrate.

A combination of the respective diameter of each of the one or more optical fibers and the velocity of the air can cause the one or more optical fibers to vibrate near a respective shedding frequency due to the shedding vortices.

A combination of the respective diameter of each of the one or more optical fibers and the velocity of the air can have a Reynolds number of greater than about 50.

The respective diameter of each of the one or more optical fibers and the velocity of the air can meet a condition of: $St*V/D \geq 100$ Hz, where V is the velocity of the air, D is the respective diameter of each of the one or more optical fibers, St is the Strouhal number, and 100 Hz is a shedding frequency. The one or more optical fibers can be generally cylindrical and a Strouhal number can be about 0.21.

The respective diameter of each of the one or more optical fibers can be in a range of about 1 mm to about 3 mm, and the velocity can be about equal to or greater than about 2 m/s.

A temperature of the air can be greater than about 15° C.

Boundary conditions of each of the one or more optical fibers can be configured to control an amplitude of vibration of each of the one or more optical fibers. The system can further comprise at least two respective retainers for each of the one or more optical fibers, wherein the boundary conditions can comprise one or more of a length of each of the one or more optical fibers between respective retainers for each of the one or more optical fibers, and a tension of each of the one or more optical fibers between the respective retainers. The amplitude of vibration of each of the one or more optical fibers can be about a same as the respective diameter of each of the one or more optical fibers.

The system can further comprise two respective retainers for retaining each of the one or more optical fibers, and a respective ratio of a respective distance between each of the two respective retainers and a diameter of a respective optical fiber can be greater than about 2:1.

The system can further comprise: an array of optical fibers including the one or ore optical fibers, arranged parallel with each other, the airflow device arranged to flow and about perpendicular to the array of optical fibers. The system can further comprise a variable pressure device located between the airflow device and the array of optical fibers, the variable pressure device configured to produce a gradient in the velocity of the air from the airflow device as the air flows over the array of optical fibers, so that a frequency of vibration of each of the optical fibers in the array varies across the array. The variable pressure device can comprises a variable pressure drop mesh.

The airflow device can comprise one or more of a fan, a cooling fan, and a blower.

The system can further comprise a cabinet housing the airflow device and at least a portion of the one or more optical fibers. The airflow device can comprises a cooling fan for the cabinet. The system can further comprise an exhaust in the cabinet for the air to flow past the one or more optical fibers.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to per form the function, or is otherwise capable of performing the function.

Figure 1:
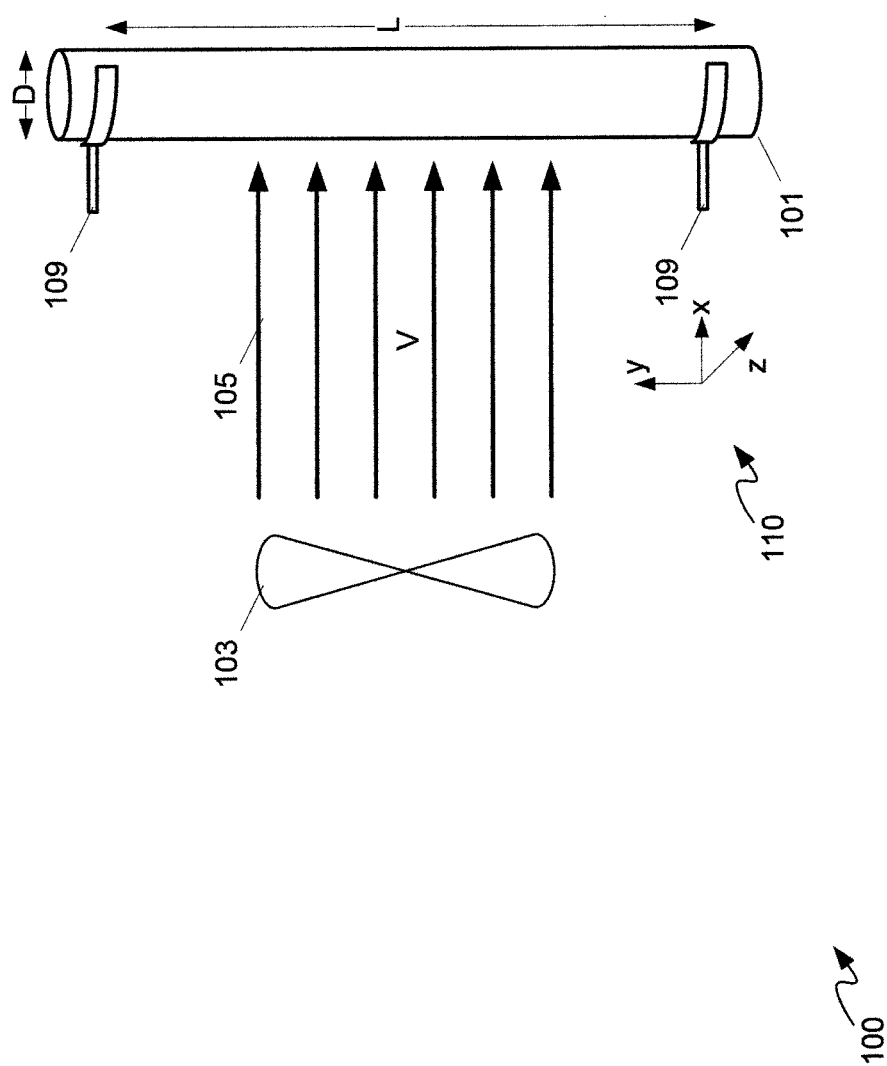
FIG. 1 depicts a schematic diagram of a system for vibrating optical fibers using an airflow device, according to non-limiting implementations.

FIG. 1 depicts a system 100 for vibrating optical fibers, according to non-limiting implementations. System 100 comprises: one or more optical fibers 101, each of the one or more optical fibers comprising a respective diameter, D; and, an airflow device 103 arranged to flow air 105 over, and about perpendicular to, the one or more optical fibers at a velocity, V, a combination of respective diameter, D, of each of the one or more optical fibers and velocity V of air 105 configured to cause one or more optical fibers 101 to produce shedding vortices causing the one or more optical fibers to vibrate. In some implementations the combination of respective diameter D of each of one or more optical fibers 101 and velocity V of air 105 causes one or more optical fibers 101 to vibrate a and/or near a respective shedding frequency due to the shedding vortices While only one optical fiber 101 is depicted in system 100, it is appreciated that system 100 can comprise a plurality of optical fibers 101, each similar to optical fiber 101, but having a same or different respective diameter. In general, diameter D of optical fiber 101 can be between about 1 mm and about 3 mm, and diameter D is generally appreciated to comprise an outer diameter of optical fiber 101. Indeed, diameter D can be varied by adding layers to the optical fiber D including, but not limited to, cladding layers, sheathing layers, armour layers and the like. In some implementations, diameter D of optical fiber 101 can be increased along portion of optical fiber 101 that is interacting with air 105 from airflow device 103, for example by wrapping optical fiber 101 in plastic, foil, and the like.

Further, while optical fibers depicted herein are generally cylindrical, other geometries of optical fibers are within the scope of present implementations. For example, while cylindrical optical fibers have a circular lateral cross-section, other optical fibers within the scope of present implementations can include, but are not limited to, optical fibers with: cross-sections having edges and/or corners (such as a hexagon, an octagon, or the like); rounded cross-sections; regular cross-sections; irregular cross-sections; and the like. Indeed, any cross-section, and in particular blunt cross-sections, of optical fibers that causes flow to separate is a candidate for vortex induced vibration. Further optical fibers within the scope of present implementations can have cross-sections that are constant or different along a length of the optical fibers.

In depicted implementations, system 100 further comprises retainers 109 for retaining optical fiber 101 in a path of air 105. Retainers 109 are generally separated by length, L, and maintain a tension on optical fiber 101 between retainers 109. Each retainer 109 can include, but is not limited to, a clamp, a fastener, a rack and the like. When system 100 comprises more than one optical fiber 101, system 100 can further comprise respective retainers for each optical fiber 101.

Airflow device 103 can generally comprise any device for generating airflow, including, but not limited to, a fan, a cooling fan, a blower, and the like. It is appreciated that airflow device 103 is only depicted schematically, but can include, but is not limited to, a housing, blades, blowers, a source of power, and the like. Further, airflow device 103 can be variable such that velocity V of air 105 can be controlled; in other words, airflow device 103 can include a speed control. While not depicted, a pressure control device can be located between airflow device 103 and optical fiber 101 for generating an about uniform velocity Va of air 105 over optical fibers 101. The pressure control device can comprise one or more of a settling chamber, a screen, a mesh, a honeycomb and combinations thereof.

FIG. 1 also depicts a coordinate system 110 for system 100; with reference to coordinate system 110, air 105 travels along an x-direction of coordinate system 110, and optical fiber 101 is about perpendicular to air 105 along a y-direction of coordinate system 110. A z-direction of coordinate system 110 is appreciated to be "out-of-the-page" of FIG. 1 (i.e., a transverse direction).

Figure 2:
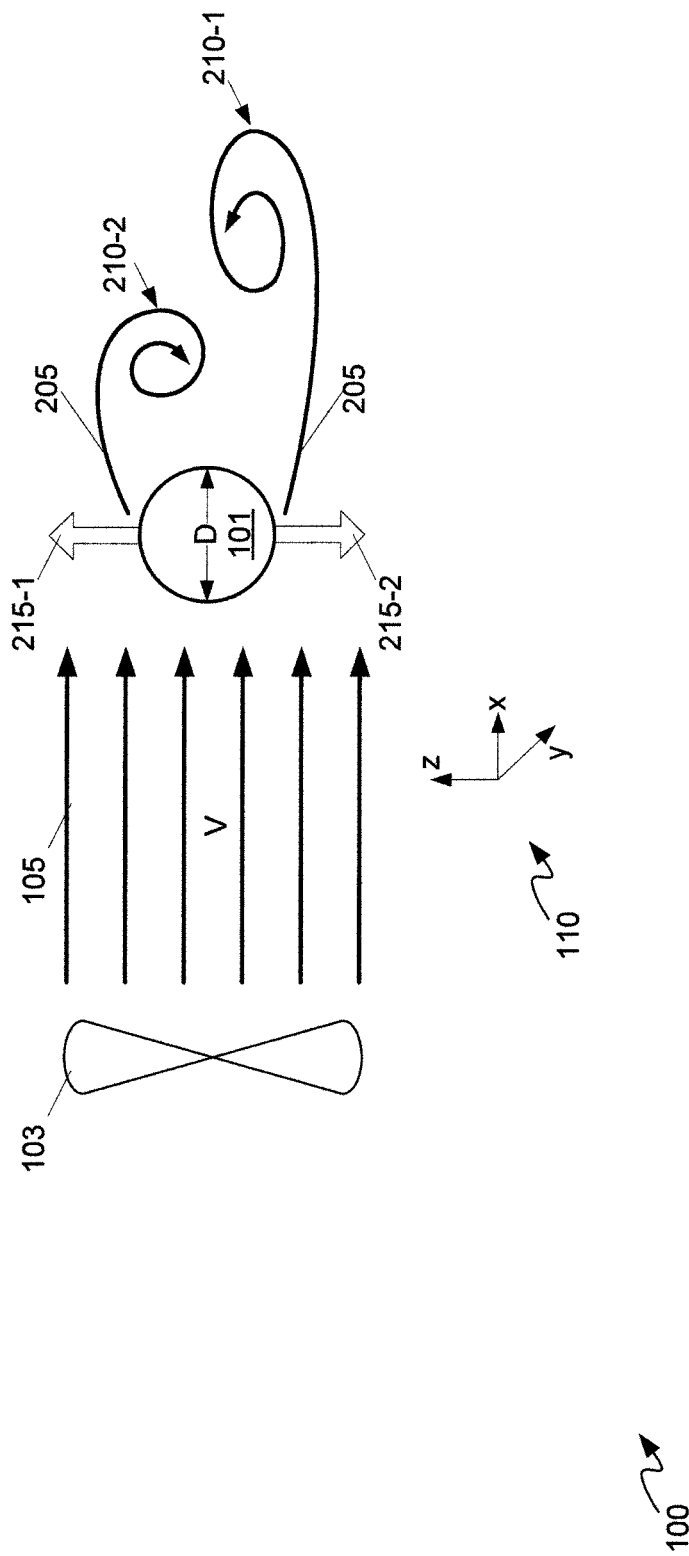
FIG. 2 depicts the system of FIG. 1 showing a Von-Kármán vortex street formed an optical fiber interacting with flowing air, according to non-limiting implementations.

Attention is next directed to FIG. 2, which depicts system 100 with optical fiber 101 depicted in cross-section and airflow device 103 depicted in schematic. In other words, FIG. 2 depicts system 100 with the y-direction of coordinate system 110 being out-of-the-page indicating that optical fiber 101 is also out of the page.

FIG. 2 further depicts a downstream wake 205 of air 105, i.e. downstream from optical fiber 101. Otherwise FIG. 2 is substantially similar to FIG. 1, with like elements having like numbers.

From FIG. 2, it is apparent that optical fiber 101 is generally cylindrical. When such a cylinder is placed in the path of air 105, flow of the upstream uniform air (i.e. air 105 from airflow device 103) is disrupted by the presence of the cylinder. Depending on properties of air 105, velocity V, and diameter of the cylinder, i.e. diameter, D, of optical fiber 101, the downstream wake 205 of air 105 is governed by turbulent motion. A phenomenon that occurs in the wake of cylinders is the Von-Kármán vortex street, which is a repeating pattern of alternating vortices caused by unsteady separation of flow of a fluid around blunt bodies. The vortices of a Von-Kármán vortex street are also known as shedding vortices. A frequency of the shedding vortices dictates the subsequent vibration of the cylinder.

However, Von-Kármán vortex street can occur with other shapes and present implementations are not limited to cylindrical optical fibers, as described above.

In any event, with reference to FIG. 2, when air 105 interacts with optical fiber 101, shedding vortices 210-1, 210-2 are formed in the downstream wake 205 of air 105, which induces optical fiber 101 to vibrate due to the resulting transverse forces (i.e. in the z-direction of coordinate system 110) caused by alternating shedding vortices 210-1, 210-2, as described in further detail below. Shedding vortices 210-1, 210-2 will also be referred to hereafter, collectively, as shedding vortices 210, and generically as a shedding vortex 210.

While only two shedding vortices 210 are depicted in FIG. 2 it is appreciated that shedding vortices 210 occur at a frequency determined by velocity V of air 105 and diameter D of optical fiber 101, as long as air 105 is flowing at velocity V. Further, shedding vortices 210 are alternately formed on opposite sides of optical fiber 101, along the z-direction of coordinate system 110 (i.e. perpendicular to both a direction of flow of air 105 and a longitudinal direction of optical fiber 101). For example shedding vortex 210-1 is formed first, as depicted, and shedding vortex 210-2 is formed after shedding vortex 210-1 (i.e. shedding vortex 210-2 is depicted as closer to optical fiber 101 than shedding vortex 210-1). After shedding vortex 210-2 is formed, another shedding vortex 210 is formed on the same side as shedding vortex 210-1; and then yet a further shedding vortex 210 is formed on the same side as shedding vortex 210-2. Alternating shedding vortices 210 continues as long as air 105 is flowing.

The alternating of shedding vortices 210 from side-to-side generally displaces optical fiber 101 from side-to-side along the z-direction of coordinate system 110, as represented by arrows 215-1, 215-2. In other words, shedding vortex 210-1, which occurs prior to shedding vortex 210-2, displaces optical fiber 101 in a direction of arrow 215-1, and then shedding vortex 210-2 displaces optical fiber 101 in a direction of arrow 215-2.

However, shedding vortices 210 are generally formed only when certain conditions are met. Firstly, a Reynolds number of system 100 generally above about 50 in order for shedding vortices 210 to occur. Specifically, in fluid mechanics, the Reynolds number (Re) is a dimensionless number that provides a measure of a ratio of inertial forces to viscous forces of a fluid interacting with a body, and hence quantifies relative importance of these two types of forces for given flow conditions. For system 100, Re is appreciated to be:

$$Re = VD/v \qquad \text{Equation 1}$$

where V is the velocity of air 105, D is the diameter of optical fiber 101 and v is kinematic viscosity of air 105, which is between about $14 \times 10^{-6}$ m$^2$/s and about $17 \times 10^{-6}$ m$^2$/s for air at about room temperature (e.g. about 15 to 40° C.). In a non-limiting example, presuming that diameter D is about 2 (i.e. $2 \times 10^{-3}$ m), velocity V is about 2 m/s and kinematic viscosity v is about $15 \times 10^{-6}$ m$^2$/s (i.e. air 105 is about 25° C.), Re is about 260, and hence shedding vortices 210 occur under these conditions.

However, as long as Re is above about 50, shedding vortices 210 occur. Further, vortex shedding persists even at extremely high Re, up to and including Re=1,000,000.

Hence, the combination of respective diameter D of each of one or more optical fibers 101 and velocity V of air 105 are chosen such that system 100 has a Reynolds number of greater than about 50 (and up to about 1,000,000). Velocity V can be controlled by controlling airflow device 103. A temperature of air 105 can also be controlled to control kinematic viscosity of air 105. In some implementations, a temperature of air 105 can be greater than about 15° C.; however, Equation 1 is relatively insensitive to air temperature over a range of about 0° C. to about 60° C.

In other words, vibration can be induced in optical fiber 101 by adjusting incoming air velocity and/or modifying the diameter D of optical fiber 101. Alternatively, temperature of air 105 can be controlled.

In some implementations, a frequency of vibration of optical fiber 101 can be controlled so that optical fiber 101 vibrates at high frequencies relative to human eye response, for example above about 100 Hz, in order to reduce image defects in projected images formed from coherent light being conveyed by optical fiber 101.

In general, the Strouhal number, St is a dimensionless number describing oscillating flow mechanisms. The value of the Strouhal number St can be different for different shapes. For a cylinder, and hence optical fiber 101, Strouhal number, is about 0.21. Further the Strouhal number is defined by the following equation:

$$St = fD/V \qquad \text{Equation 2}$$

where St is the Strouhal number, f is a frequency of vortex shedding (and hence a frequency of vibration of optical fiber 101), D is the diameter of cylindrical optical fiber 101, and V is velocity of air 105. Hence, to calculate frequency f of vibration of optical fiber 101, the following equation can be used by rearranging Equation 2:

$$f = StV/D \qquad \text{Equation 3}$$

Hence, presuming that the Reynolds number is above about 50 for a combination of velocity V of air 105 and diameter D of optical fiber 101, frequency can be controlled by varying velocity V of air 105. Further, for a cylinder with a Strouhal number of about 0.21, frequency f can be determined from:

$$f = 0.21 V/D \qquad \text{Equation 4}$$

Figure 3:
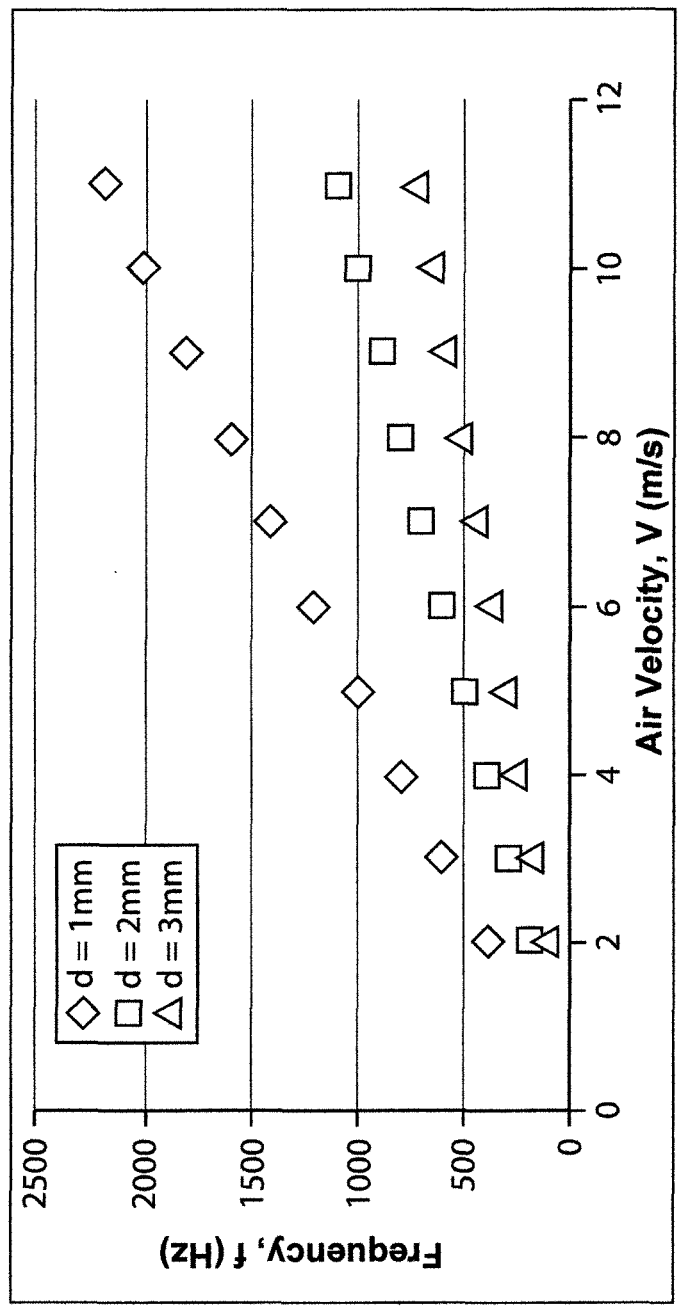
FIG. 3 depicts a frequency of vibration of optical fibers of the system of FIG. 1 as a function of velocity for three different diameters of optical fibers, according to non-limiting implementations.

Attention is next directed to FIG. 3 which depicts frequency f in Hz as a function of velocity V of air 105 for optical fiber 101 diameters of about 1 mm, about 2 mm and about 3 mm, using equation 4. From FIG. 3, it is apparent that, a velocity V of about 2 m/s and above, for each of diameters 1 mm, 2 mm and 3 mm, frequency f is above 100 Hz. Further, using Equation 1, for respective diameter D of one or more optical fibers 101 in a range of about 1 mm to about 3 mm, and velocity V being about equal to or greater than about 2 m/s, the Reynolds number is above about 50.

Hence, by choosing respective diameter D of each of one or more optical fibers 101 and velocity V of air 105 to meet the condition of St*V/D≥100 Hz (i.e. Equation 3 with frequency f greater than or equal to about 100 Hz), and so that the Reynolds number is above about 50, one or more optical fibers 101 can be vibrated at above about 100 Hz in order to reduce image defects in projected images formed from coherent light being conveyed by one or more optical fibers 101, and hence improve image quality in projection systems using the coherent light being conveyed by one or more optical fibers 101 to form the projected images. In other words, vibration of optical fiber 101 reduces coherency of coherent light being conveyed there through. However, complex flows can affect vibrating frequency of one or more optical fibers 101 such that the actual vibrating frequency can differ from the analytically calculated shedding frequency, which is calculated using the Strouhal number.

For cylinders, the condition related to Strouhal number becomes 0.21*V/D≥100 Hz, though for geometries other than cylindrical optical fibers, the Strouhal number can vary.

Furthermore, in general, a ratio between length L between retainers 109, and diameter D, is controlled and/or configured to be greater than about 2 (i.e. L/D is greater than about 2). Indeed, when L/D is less than 2 and/or very much less than 2, vortex shedding may not occur.

Further, boundary conditions of each of one or more optical fibers 101 can be configured to control an amplitude of vibration of each of one or more optical fibers 101. For example, an amplitude of vibration of each of one or more optical fibers 101 can be about the same as respective diameter D of each of one or more optical fibers 101. In general amplitude of vibration is controlled and/or configured so as to not damage optical fibers 101 during vibration due to shedding vortices 210. In some implementations optical fibers 101 can have a natural frequency due to a given set of conditions including, but not limited to, the boundary conditions; when the shedding frequency is about the natural frequency of optical fibers 101, further components can be introduced to dampen vibration of optical fibers 101 to ensure that excessive vibration/amplitude does not cause catastrophic failure of optical fibers 101. Alternatively, the conditions can be chosen so that the natural frequency of optical fibers 101 is different from the shedding frequency. Alternatively, a velocity of air 105 can be chosen and/or adjusted so that the shedding frequency is different from the natural frequency of the optical fibers.

With reference to FIG. 1, and as described above, system 100 comprises respective retainers 109 for each of one or more optical fibers 101. Respective retainers 109 can be used to control and/or configure the boundary conditions of one or more optical fibers 101. For example, such boundary conditions can include, but are not limited to, one or more of a length L of each of one or more optical fibers 101 between respective retainers 109 for each of one or more optical fibers 101, and a tension of each of one or more optical fibers 101 between respective retainers 109.

Figure 4:
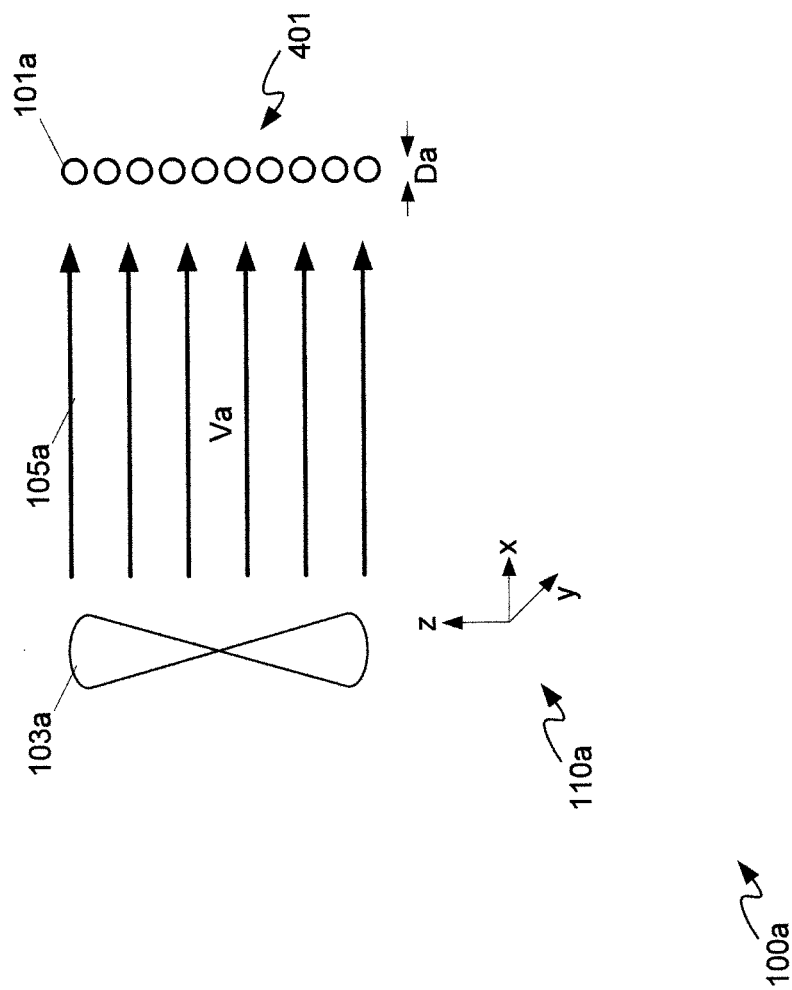
FIG. 4 depicts a schematic diagram of an alternative system for vibrating optical fibers in an array using an airflow device, according to non-limiting implementations.

While system 100 has been described with reference to one optical fiber 101, system 100 can be adapted to comprise an array of optical fibers, including optical fiber 101. For example, attention is next directed to FIG. 4, which is substantially similar to FIG. 2, with like elements having like numbers however with an "a" appended thereto. Hence, FIG. 4 depicts a system 100a comprising an array 401 of optical fibers 101a each similar to optical fiber 101, array 401 of optical fibers 101a arranged parallel with each other; and an airflow device 103a arranged to flow air 105a over, and about perpendicular to array 401 of optical fibers 101a, each of optical fibers 101a in array 401 comprising a respective diameter Da, which can be similar or different from each other (and/or optical fiber 101). A combination of a respective diameter Da of each of optical fibers 101a in array 401 and the velocity Va of air 105a is configured to cause each of optical fibers 101a in array 401 to vibrate at a respective shedding frequency. In other words, the velocity Va of air 105a and a respective diameter Da of each of optical fibers 101a are configured to meet the condition of St*Va/Da≥100 Hz, (i.e. Equation 3 with frequency f greater than or equal to about 100 Hz, where Va is velocity of air 105a and Da is a respective diameter of each optical fiber 101a, and St can be about 0.21 for cylinders), and so that respective Reynolds numbers of combinations velocity Va of air 105a and each optical fiber 101a is above about 50, similar to system 100.

While only one optical fiber 101a in array 401 is explicitly indicated in FIG. 4, it is appreciated that in depicted implementations array 401 comprises ten optical fibers 101a. Further, array 401 can comprise any number of optical fibers 101a. Further system 100a can comprise any number of airflow devices 103a for flowing air 105a over array 401.

A coordinate system 110a is also depicted in FIG. 4, similar to coordinate system 110, showing that array 401 of optical fibers 101a are arranged in row along the z-direction, and that air 105c is flowing perpendicular to the row in the x-direction.

While not depicted, system 100a can further comprise respective retainers for each optical fiber 101a, similar or different from retainers 109, for retaining each of optical fibers 101a in array 401. In some implementations such retainers can be components of one or more racks for retaining optical fibers 101a.

While not depicted, a pressure control device can be located between airflow device 103a and array 401 of optical fibers 101a for generating an about uniform velocity Va of air 105a over optical fibers 101a. The pressure control device can comprise one or more of a settling chamber, a screen, a mesh, a honeycomb, and combinations thereof.

In further implementations, a velocity Va of air 105a flowing across array 401 can be varied in order to induce different vibration frequencies in each of optical fibers 101a, especially when each of optical fibers 101 have a similar diameter Da.

Figure 5:
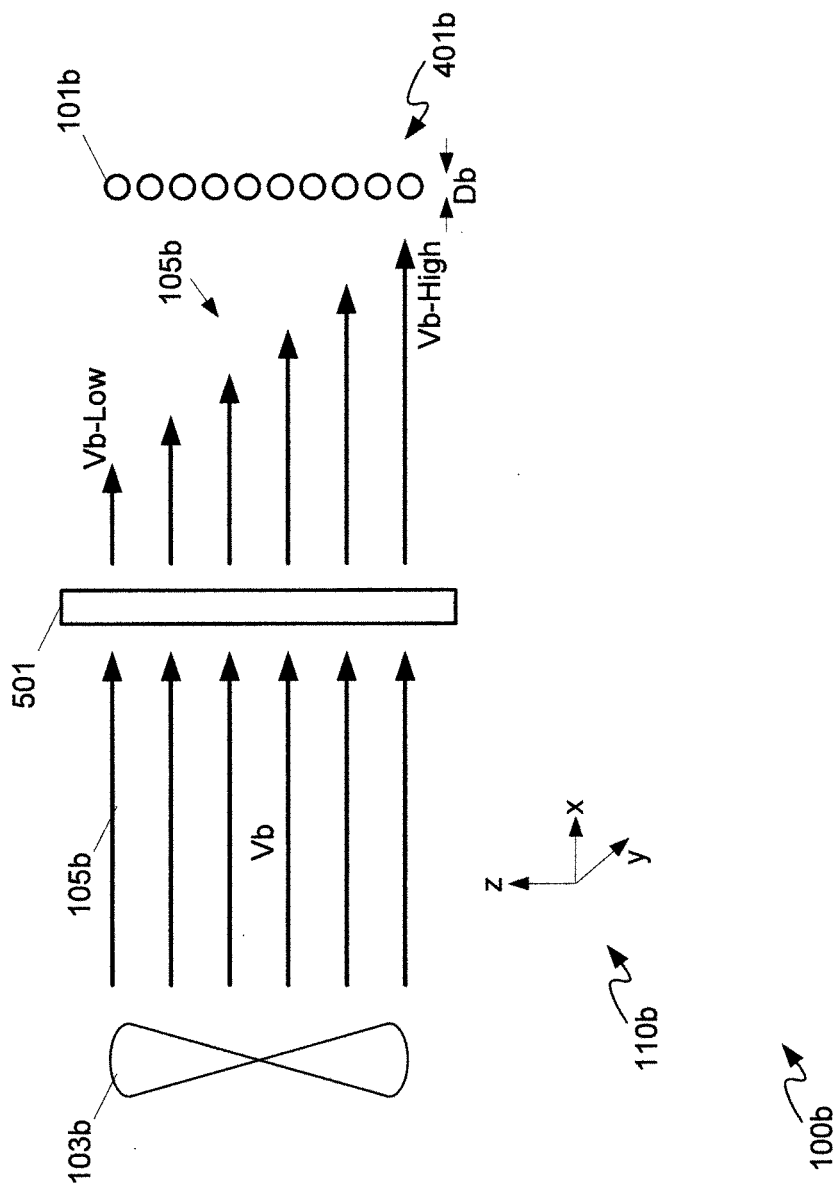
FIG. 5 depicts a schematic diagram of a further alternative system for vibrating optical fibers in an array using an airflow device and variable airflow, according to non-limiting implementations.

For example, attention is now directed to FIG. 5, which depicts a system 100b, that is substantially similar to system 100a, with like elements having like numbers, but with a "b" appended thereto rather than an "a". Hence, FIG. 5 depicts a system 100b comprising an array 401b of optical fibers 101b, each similar to optical fiber 101, array 401b of optical fibers 101b arranged parallel with each other; and an airflow device 103b arranged to flow air 105b over, and about perpendicular to array 401b of optical fibers 101b, each of optical fibers 101b in array 401b comprising a respective diameter Db, which can be similar or different from each other (and/or optical fiber 101). A combination of a respective diameter Db of each of optical fibers 101b in array 401b and the velocity Vb of air 105 is configured to cause each of optical fibers 101b in array 401b to vibrate at a respective shedding frequency. In other words, the velocity Vb of air 105b and a respective diameter Db of each of optical fibers 101b are configured to meet the condition of St*Vb/Db≥100 Hz, (i.e. Equation 3 with frequency f greater than or equal to about 100 Hz, where Vb is velocity of air 105b and Db is a respective diameter of each optical fiber 101b, and St can be about 0.21 for cylinders), and so that respective Reynolds numbers of combination of velocity Vb of air 105b and each optical fiber 101b is above about 50, similar to systems 100, 100a A coordinate system 110b) is also depicted in FIG. 4, similar to coordinate system 110.

However, in contrast to system 100a, system 100b further comprises a variable pressure device 501 located between airflow device 103b and array 401b of optical fibers 101b, variable pressure device 501 configured to produce a gradient in velocity Vb of air 105b from airflow device 103b as air 105b flows over array 401b of optical fibers 101b, so that the respective shedding frequency of each of optical fibers 101b can vary across array 401b.

In some implementations, variable pressure device 501 can comprise a variable pressure drop mesh, which lowers velocity Vb of air 105b at one end to a velocity Vb-Low; at an opposite end, air 105b from variable pressure device 501 is moving at a velocity Vb-High, greater than velocity Vb-Low. In some implementations velocity Vb-High can be about the same as velocity Vb. The velocity of air 105 can vary continuously and/or in steps between velocity V-Low and velocity V-High.

Hence, a vibration frequency of an optical fiber 101 interacting with air 105b flowing at velocity Vb-Low will be lower than a vibration frequency of an optical fiber 101 interacting with air 105b flowing at velocity Vb-High. Vibration frequency of optical fibers 101b will vary continuously and/or in steps from the lowest vibration frequency to the highest vibration frequency.

In some implementations, each of optical fibers 101b can be conveying coherent light to a same image modulator in a projector, and each of optical fibers 101b can be of a similar diameter Db. By varying velocity Vb of air 105b flowing across optical fibers 101b so that respective vibration frequencies vary across optical fibers 101b, image defects in a projected image can be further reduced, as coherency is reduced by different amounts in optical fibers 101b vibrating a different frequencies; furthermore as the different vibration frequencies further change a phase of coherent light being conveyed in different optical fibers 101b, when light from different optical fibers 101b is combined, coherency of the combined light is further reduced.

Figure 6:
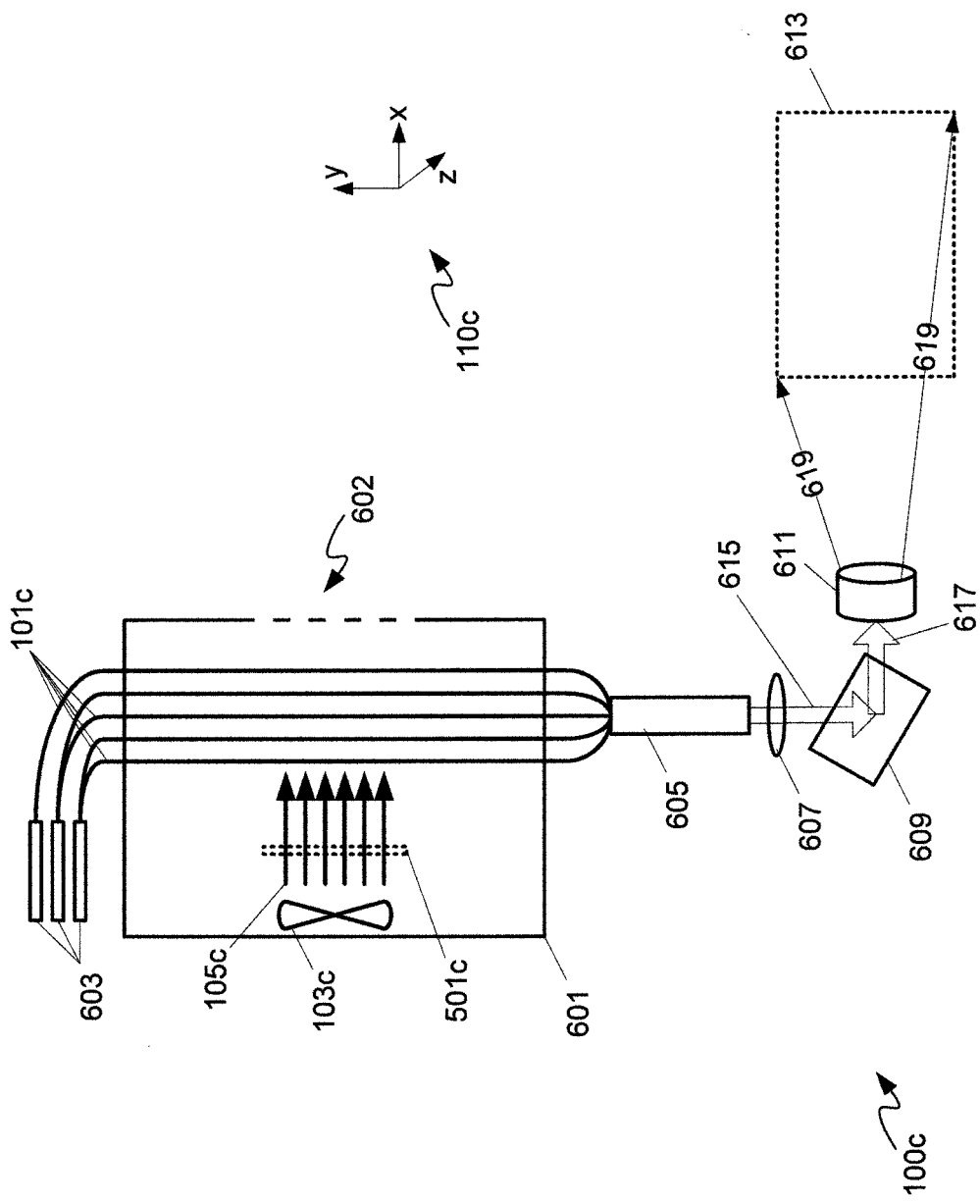
FIG. 6 depicts a schematic diagram of a projection system, that includes optical fibers in an array vibrated using an airflow device, according to non-limiting implementations.

Attention is next directed to FIG. 6, which depicts a schematic diagram of a system 100c comprising: a plurality of optical fibers 101c, each of the plurality of optical fibers 101c comprising a respective diameter; and, an airflow device 103c arranged to flow air 105c over, and about perpendicular to, plurality of optical fibers 101c at a velocity, a combination of the respective diameter of each of plurality of optical fibers 101c and velocity of air 105c configured to cause each of plurality of optical fibers 101c to vibrate at a respective shedding frequency.

In other words, the velocity of air 105c and a respective diameter of each of optical fibers 101c are configured to meet the condition of St*Vc/Dc≥100 Hz, (i.e. Equation 3 with frequency f greater than or equal to about 100 Hz, where Vc is velocity of air 105c and Dc is a respective diameter of each optical fiber 101b, and St can be about 0.21 for cylinders), and so that respective Reynolds numbers of combination of velocity of air 105c and each optical fiber 101c is above about 50, similar to systems 100, 100a,100b.

Each of plurality of optical fibers 101c can be similar to optical fiber 101, but each can comprise a respective diameter that is similar or different to each other (and/or similar to different to optical fiber 101). While five optical fibers 101c are depicted in FIG. 6, any number of optical fibers 101c is within the scope of present implementations. Further, while optical fibers 101c are depicted as arranged in a row along an x-direction of coordinate system 110c, it is appreciated that FIG. 6 is merely a schematic diagram and the depiction of optical fibers 101c arranged along the x-direction is merely for clarity; rather, optical fibers 101c are arranged along the z-direction so that optical fibers 101c form an array similar to arrays 401, 401b. In other words, plurality of optical fibers 101c can be arranged in an array similar to arrays 401, 401b.

Airflow device 103c can be similar to airflow device 103, and further system 100c can comprise more than one airflow device 103c.

In some implementations, system 100c can further comprise a variable pressure device 501c, similar to variable pressure device 501, and similarly arranged with respect to plurality of optical fibers 101c and airflow device 103c. As variable pressure device 501c is optional, variable pressure device 501c is depicted in stippled lines.

System 100c further comprises a cabinet 601 housing airflow device 103c and at least a portion of plurality optical fibers 101c interacting with air 105c. Hence, in these implementations, airflow device 103c can comprise a cooling fan for cabinet 601. Further system 100c can comprise an exhaust 602 in cabinet 601 for air 105c to flow past plurality of optical fibers 101c and out of cabinet 601.

While not depicted, cabinet 601 can comprise further electronic components of system 100c including, but not limited to, electrical components, power supplies, optical components, mechanical components and the like. Further, cabinet 601 can comprise retainers and/or racks, for retaining optical fibers 101c, similar to, or different from, retainers 109. Electrical components, and the like, in cabinet 601 can be cooled by air 105c by locating the components between optical fibers 101c and exhaust 602; however such components are located in cabinet 601 so as to not interfere with the Von-Kaman vortex streets formed by each optical fiber 101c interacting with air 105c similar to FIG. 2.

System 100c further comprises one or more coherent light sources 603, an integrator device 605, optical components 607, a light modulator 609, and projection optics 611. System 100c can optionally comprise a screen 613.

In general, coherent light is produced by one or more coherent light sources 603, including, but not limited to lasers, red lasers, green lasers, blue lasers, and the like. As depicted, coherent light sources 603 are external to cabinet 601; however, in other implementations, coherent light sources 603 can be internal to cabinet 601. While three coherent light sources 603 are depicted, system 100c can comprise any number of coherent light sources.

Each of plurality of optical fibers 101c are optically coupled to one of coherent light sources 603 at one end, and to integrator device 605 at an opposite end such that plurality of optical fibers 101c convey light from one or more coherent light sources 603 to integrator device 605. While FIG. 6 depicts up to two optical fibers 101c coupled to each coherent light source 603, any suitable number of optical fibers 101c can be coupled to each coherent light source 603 using, for example, a coupling device (not depicted).

Between one or more coherent light sources 603 and integrator device 605, plurality of optical fibers 101c are routed through cabinet 601 so that air 105c from airflow device 103c can interact with plurality of optical fibers 101c to induce vibration frequencies in each of plurality of optical fibers 101c. Hence, cabinet 601 can comprise one or more apertures for routing optical fibers 101c there through.

Light from plurality of optical fibers 101c is conveyed to integrator device 605, for example using a coupling device (not depicted); integrator device 605 integrates light from plurality of optical fibers 101c. Integrated light 615 from integrator device 605 is conveyed to light modulator 609, via optical components 607, which can include, but is not limited to, lenses, mirrors, light shapers, apertures and the like.

Light modulator 609 generally modulates integrated light 615 into images; light modulator 609 can include, but is not limited to, reflective light modulators, transmissive light modulators, digital micro-mirror devices, liquid crystal on silicon devices, and the like.

Modulated light 617 from light modulator 609 is then projected using projection optics 611, for example so that projected light 619, comprising projected images, is projected onto optional screen 613 or the like. As such, system 100c generally comprises a projection system.

Furthermore, coherence of light produced by one or more coherent light sources 603 is generally reduced by vibration of optical fibers 101c conveying light from one or more coherent light sources 603 to integrator device 605; further reductions in coherence of light integrated at integrator device 605 can be achieved using variable pressure device 501c so that a degree of decoherence in each of optical fibers 101c is different, and hence further decoherence of light occurs at integrator device 605 as light from each of plurality of optical fibers 101c interferes at integrator device 605.

Figure 7:
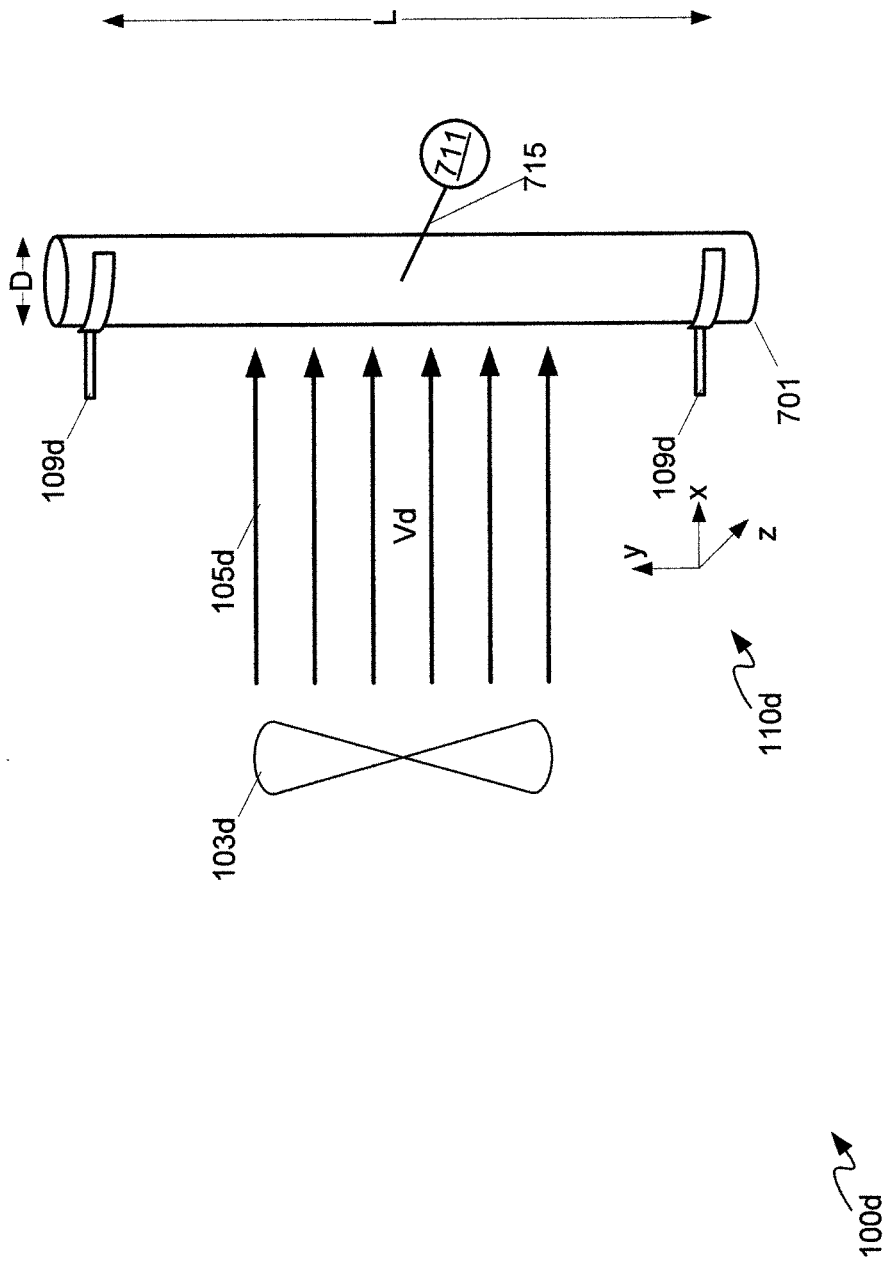
FIG. 7 depicts a schematic diagram of a system for vibrating elongated fibers using an airflow device, which in turn cause optical components to vibrate, according to non-limiting implementations.

Similar concepts can be used to vibrate optical components using elongated fibers (which are not necessarily optical fibers) in optical systems. For example, attention is directed to FIG. 7, which depicts a system 100d comprising: one or more e 701, each of one or more elongated fibers 701 comprising a respective diameter D; one or more optical components 711 for at least one of conveying coherent light and interacting with the coherent light; and, an airflow device 103d arranged to flow air 105d over, and about perpendicular to, one or more elongated fibers 701 at a velocity Vd, combination of the respective diameter D of each of one or more elongated fibers 701 and velocity Vd of air 105d configured to cause one or more elongated fibers 701 to produce shedding vortices that cause one or more elongated fibers 701 and one or more optical components 711 to each vibrate. In some implementations, more than one optical component 711 can be attached to an elongated fiber 701.

System 100d further comprises two respective retainers 109d, separated by a length L, for retaining one or more elongated fibers 701. In general airflow device 103d is similar to airflow device 103, and retainers 109d are similar to retainers 109. Further, dimensions of one or more elongated fibers 701 are similar to dimensions of one or more optical fibers 101, and system 100d generally meets conditions discussed above with respect to equations 1, 2, 3 and 4 in order to produce shedding vortices; as well L/D is generally greater than about 2.

However, elongated fibers 701 need not convey coherent light, though in some implementations one or more elongated fibers 701 can each comprise one or more optical component, each of the one or more optical components comprising a respective optical fiber, similar to one or more optical fibers 101 of FIG. 1.

However, as depicted, one or more elongated fibers 701 need not convey light, and one or more optical components 711 are attached to a respective one of the one or more elongated fibers 701, for example using a respective attachment device 715, and the shedding vortices cause the one or more elongated fibers 701 to vibrate which in turn causes the one or more optical components 711 to vibrate. For example, in some of these implementations, one or more optical components can comprise one or more of a diffuser a fly's eye lens, and a lenslet array, and each of the one or more optical components can be configured to one or more of: convey and/or interact with light to scatter the light, and specifically coherent light; reduce coherency of coherent light; and/or improve uniformity of coherent light. In other words, the same principles applied above to one or more optical fibers 101 are used to vibrate one or more elongated fibers 701, which in turn cause one or more optical components 711 to vibrate.

In some implementations, attachment device 715 can comprise an optical mount.

In further implementations, attachment device 715 can rigidly attach one or more optical components 711 to one or more elongated fibers 701

In yet further implementations, attachment device 715 attaches one or more optical components 711 to one or more elongated fibers 701 in a transverse direction (for example in a z-direction of coordinate system 110d), however, in other implementations, attachment device 715 attaches one or more optical components 711 to one or more elongated fibers 701 in any direction that does not interfere with vortex shedding. Similarly, one or more optical components 711 are oriented in a direction that does not interfere with vortex shedding.

It is further appreciated that, as elongated fibers 701 need not convey light and/or extend from a coherent light source to a projector input, a length of each elongated fiber 701 can be about length L and/or slightly longer than length L such that retainers 109d can retain an elongated fiber 701.

It is further appreciated that system 100d can comprise one or more coherent light sources that are focussed on one or more optical components 711 and/or arranged such that coherent light emitted there from is received at one or more optical components 711, and thereafter is conveyed to an input of a projection device, such as integrator device 605.

In some implementations, one or more optical components 711 can be generally circular with a diameter of between about 10 mm to about 35 mm, though many shapes and dimensions of one or more optical components 711 are within the scope of present implementations.

However, one or more optical components 711 are generally not of a shape that can induce a Von-Kaman vortex street and/or shedding vortices. Hence, to vibrate one or more optical components, the one or more optical components 711 are attached to one or more elongated fibers 701, which vibrate when interacting with air 105d, which in turn vibrates one or more optical components 711. The vibrating of the one or more optical components 711, as coherent light is conveyed there through, causes further decohering of the coherent light, which reduces speckle in images produced by a projection system using the decohered coherent light to produce the images, and generally improves uniformity of projected light onto a screen or the like.

Furthermore, air 105d further serves to cool one or more optical components 711 in system 100d. For example, optical components such as diffusers, fly's eye lenses and lenslet arrays can be lossy (i.e. inefficient transmission of light/coherent light and/or be absorptive of light/coherent light); for example up to 20% of coherent light conveyed there through can be lost, with some portion being converted into heat, which causes the optical components to heat up, which can change their optical properties and/or damage them. Such heating can be especially severe in confined spaces, such as cabinet 601. Hence, system 100e both serves to decohere coherent light at one or more optical components 711 and cool one or more optical components 711.

Figure 8:
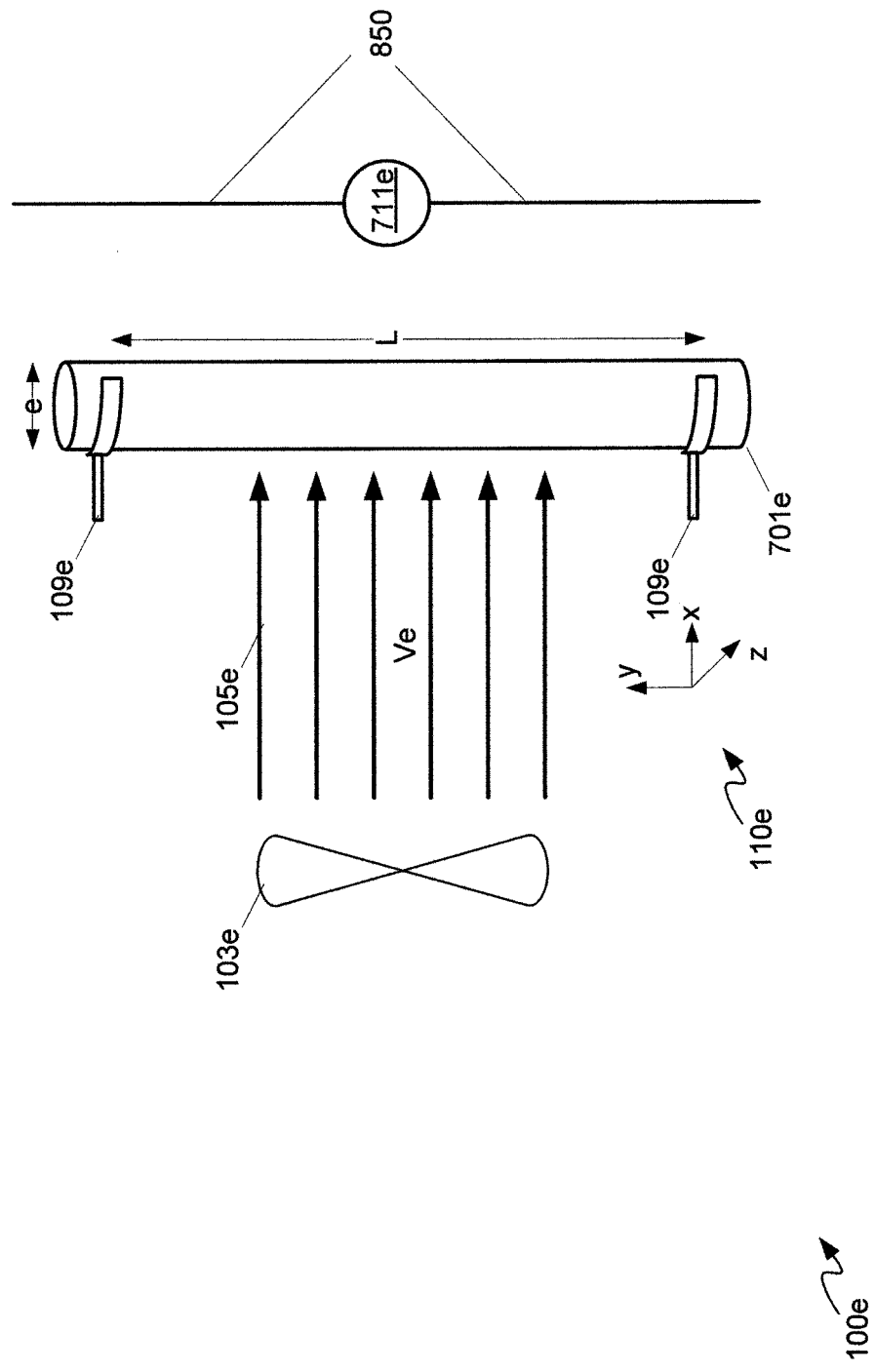
FIG. 8 depicts a schematic diagram of a system for vibrating elongated fibers using an airflow device, which produce shedding vortices that cause optical components located in the wake of the elongated fibers to vibrate, according to non-limiting implementations.

Attention is next directed to FIG. 8, which depicts a system 100e that is substantially similar to system 100d, with like elements having like numbers, however an "e" appended thereto rather than a "d". Hence, system 100e comprises one or more elongated fibers 701e, each of one or more elongated fibers 701e comprising a respective diameter D; one or more optical components 711e for at least one of conveying coherent light and interacting with the coherent light; and, an airflow device 103e arranged to flow air 105e over, and about perpendicular to, one or more elongated fibers 701e at a velocity Ve, a combination of the respective diameter D of each of one or more elongated fibers 701e and velocity Ve of air 105e configured to cause one or more elongated fibers 701e to produce shedding vortices that cause one or more elongated fibers 701e and one or more optical components 711e to each vibrate. System 100e further comprises two respective retainers 109e, separated by a length L, for retaining one or more optical fibers 701e. In general airflow device 103e is similar to airflow device 103, and retainers 109e are similar to retainers 109. However, in these implementations, the one or more optical components 711e are located in a wake of shedding vortices, for example downstream of one or more elongated fibers 701e and/or in an x-direction of coordinate system 100e. In other words, one or more elongated fibers 701e are located between a respective optical component 711e and airflow device 103e.

Figure 9:
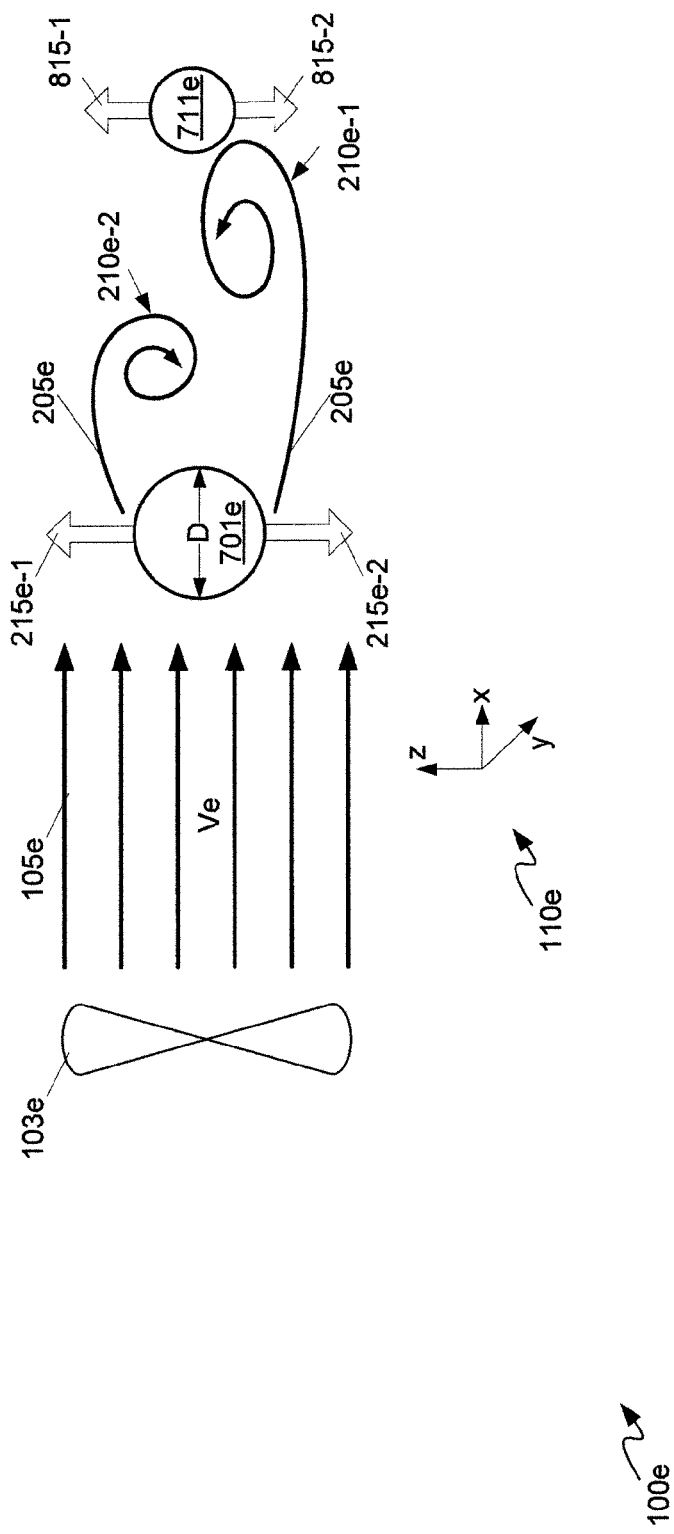
FIG. 9 depicts the system of FIG. 8 showing a Von-Kármán vortex street formed by an elongated fiber interacting with flowing air, according to non-limiting implementations.

For example, attention is next directed to FIG. 9 which depicts system 100e with elongated fiber 701e depicted in cross-section and airflow device 103e depicted in schematic. In other words, FIG. 9 depicts system 100e with the y-direction of coordinate system 110e being out-of-the-page, indicating that elongated fiber 701 is also out of the page. FIG. 9 further depicts a downstream wake 205e of air 105e, i.e. downstream from elongated fiber 701e, as well as shedding vortices 210e-1, 210e-2, similar to shedding vortices 210-1, 201-2, respectively. FIG. 9 yet further depicts arrows 215e-1, 215e-2 indicating a transverse displacement of elongated fiber 701e due to shedding vortices 210e-1, 210e-2, and arrows 815-1, 815-2 indicating a transverse displacement of optical component 711e due to shedding vortices 210e-1, 210e-2. Otherwise FIG. 9 is substantially similar to FIG. 9, with like elements having like numbers.

Returning briefly to FIG. 8, system 100e further comprises one or more suspension apparatuses 850 that suspends a respective one or more optical components 711e in downstream wake 205e. Suspension apparatuses 850 can include, but are not limited to, cables, wires, springs and the like. Suspension apparatuses 850 can be attached to a suitable surface (not depicted), such as a surface in an interior of a cabinet containing system 100e. Suspension apparatuses 850 generally suspends one or more optical components 711e in a rest position, and when one or more respective optical components 711e are displaced from the rest position, suspension apparatuses 850 returns one or more respective optical components 711e to the rest position. Further, while not depicted in FIG. 9, it is assumed that suspension apparatus 850 is present, and extending along a y-direction of coordinate system 110e (i.e. out of the page, and/or about parallel to one or more elongated fibers 701e). However, in other implementations, suspension apparatus 850 can extend along another direction, for example the z-direction of coordinate system 110e.

In any event, shedding vortices 210e-1, 210e-2 cause one or more optical components 711e to vibrate as each shedding vortex 210e-1, 210e-2 interacts with one or more optical components 711e. In other words, one or more optical components 711e are suspended in downstream wake 205e of one or more elongated fibers 701e, and the alternating shedding vortex 210e-1, 210e-2 of downstream wake 205e causes one or more optical components 711e to be alternately displaced in a direction of each of arrows 815-1, 815-2, with suspension apparatus 850 exerting a force on one or more optical components 711e to the rest position when displaced.

Like system 100d, system 100e can further comprise one or more coherent light sources that are focussed on one or more optical components 711e and/or arranged such that coherent light emitted there from is received at one or more optical components 711e, and thereafter is conveyed to an input of a projection system, such as integrator device 605. As optical components 711e are vibrating, coherency of the coherent light is reduced thereby reducing speckle in images produced by the projection system.

Further, each of systems 100d, 100e can be expanded to include: an array of elongated fibers, including the one or more elongated fibers 701, and/or the one or more elongated fibers 701, arranged parallel with each other; and, a plurality of optical components including the one or more optical components 711 and/or the one or more optical components 711e, in one-to-one relationship with the array of elongated fibers, an airflow device, similar to airflow device 103, arranged to flow the air over, and about perpendicular to the array of elongated fibers, similar to array 401 depicted in FIG. 4.

Such systems can further include a variable air pressure device, similar to variable air pressure device 501, located between the airflow device and the array of elongated fibers, the variable pressure device configured to produce a gradient in the velocity of the air from the airflow device as the air flows over the array of elongated fibers, so that a frequency of vibration of each of the elongated fibers in the array, and each of the plurality of optical components, varies across the array.

Such systems can be further integrated into a cabinet similar to cabinet 601.

Hence, provided herein is a system comprising: one or more elongated fibers, each of the one or more elongated fibers comprising a respective diameter; one or more optical components for at least one of conveying coherent light and interacting with the coherent light; and, an airflow device arranged to flow air over, and about perpendicular to, the one or more elongated fibers at a velocity, a combination of the respective diameter of each of the one or more elongated fibers and the velocity of the air configured to cause the one or more elongated fibers to produce shedding vortices that cause the one or more elongated fibers and the one or ore optical components to each vibrate.

Each of the one or more elongated fibers can comprises a respective one of the one or more optical components, each of the one or more optical components can comprise a respective optical fiber.

The one or more optical components can be attached to a respective one of the one or more elongated fibers, and the shedding vortices can cause the one or more elongated fibers to vibrate which in turn causes the one or more optical components to vibrate.

The one or more optical components can be located in a wake of the shedding vortices.

Each of the one or more optical components can comprises one or more of a diffuser, a fly's eye lens and a lenslet array.

A combination of the respective diameter of each of the one or more elongated fibers and the velocity of the air can cause the one or more elongated fibers and the one or more optical components to each vibrate near a respective shedding frequency due to the shedding vortices.

A combination of the respective diameter of each of the one or more elongated fibers and the velocity of the air can have a Reynolds number of greater than about 50.

The respective diameter of each of the one or more elongated fibers and the velocity of the air can meet a condition of: $St*V/D \geq 100$ Hz, where V is the velocity of the air, D is the respective diameter of each of the one or more elongated fibers, St is the Strouhal number, and 100 Hz is a shedding frequency. The one or more elongated fibers can be generally cylindrical and a Strouhal number can be about 0.21.

The respective diameter of each of the one or more elongated fibers can be in a range of about 1 mm to about 3 mm, and the velocity can be about equal to or greater than about 2 m/s.

A temperature of the air can be greater than about 15° C.

Boundary conditions of each of the one or more elongated fibers can be configured to control an amplitude of vibration of each of the one or more elongated fibers. The system can further comprise at least two respective retainers for each of the one or more elongated fibers, wherein the boundary conditions can comprise one or more of a length of each of the one or more elongated fibers between respective retainers for each of the one or more elongated fibers, and a tension of each of the gone or more elongated fibers between the respective retainers. The amplitude of vibration of each of the one or more elongated fibers can be about a same as the respective diameter of each of the one or more elongated fibers.

The system can further comprise two respective retainers for retaining each of the one or more elongated fibers, and a respective ratio of a respective distance between each of the two respective retainers and a diameter of a respective elongated fiber can be greater than about 2:1.

The system can further comprise: an array of elongated fibers including the one or more elongated fibers, arranged parallel with each other; and, a plurality of optical components, including the one or more optical components, in a one-to-one relationship with the array of elongated fibers, the airflow device arranged to flow the air over, and about perpendicular to the array of elongated fibers. The system can further comprise a variable pressure device located between the airflow device and the array of elongated fibers, the variable pressure device configured to produce a gradient in the velocity of the air from the airflow device as the air flows over the array of elongated fibers, so that a frequency of vibration of each of the elongated fibers in the array, and each of the plurality of optical components, varies across the array. The variable pressure device can comprises a variable pressure drop mesh.

The airflow device can comprise one or more of a fan, a cooling fan, and a blower.

The system can further comprise a cabinet housing the airflow device and at least a portion of the one or more elongated fibers. The airflow device can comprises a cooling fan for the cabinet. The system can further comprise an exhaust in the cabinet for the air to flow past the one or more elongated fibers.

Hence, provided herein are systems for vibrating optical fibers and/or elongated fibers using an airflow device arranged to flow air over the optical fibers and/or elongated fibers, which vibrates the optical fibers and/or elongated fibers without direct mechanical interaction; such vibration is gentler on optical fibers and/or elongated fibers than previous mechanical vibrators and, further, the degree of oscillation is easy to control by varying a velocity of air flowing over the optical fibers and/or elongated fibers, by varying a speed of the airflow device and/or by using a variable pressure device Flow of air over further has a cooling effect on the optical fibers and/or elongated fibers and/or optical components attached to, or in a downstream wake of, the elongated fibers. For example, while optic cables are fairly efficient (>90% over a 2-3 m length), the optical losses (for example, about 10%) can eventually dissipate to heat, which is mitigated by present implementations. However, the cooling effect is even more pronounced when the systems include optical components, such as diffusers, fly's eye lenses and lenslet arrays, which can be "lossy" and/or absorptive of light/coherent light. For example a diffuser can be small (10-20 mm in diameter) and optical losses can be as much as 20%; when the diffuser is in confined area, such as a cabinet, heating effects can be more pronounced. However, the heating is reduced by the air flowing over the optical components and/or the optical fibers, which also vibrates the optical components and the optical fibers.

Persons skilled in the art will appreciate that there are yet more alternative implementations and modifications possible, and that the above examples are only illustrations of one or more implementations. The scope, therefore, is only to be limited by the claims appended hereto

What is claimed is:

1. A system comprising: one or more elongated fibers, each of the one or more elongated fibers comprising a respective diameter; one or more optical components for at least one of conveying coherent light and interacting with the coherent light; and, an airflow device arranged to flow air over, and about perpendicular to, the one or more elongated fibers at a velocity, a combination of the respective diameter of each of the one or more elongated fibers and the velocity of the air configured to cause the one or more elongated fibers to produce shedding vortices that cause the one or more elongated fibers and the one or more optical components to each vibrate; wherein the respective diameter of each of the one or more elongated fibers and the velocity of the air meet a condition of: St*V/D≥100 Hz where V is the velocity of the air, D is the respective diameter of each of the one or more elongated fibers, St is a Strouhal number, and 100 Hz is a shedding frequency.

2. The system of claim 1, wherein each of the one or more elongated fibers comprises a respective one of the one or more optical components, each of the one or more optical components comprising a respective optical fiber.

3. The system of claim 1, wherein the one or more optical components are attached to a respective one of the one or more elongated fibers, and the shedding vortices cause the one or more elongated fibers to vibrate which in turn causes the one or more optical components to vibrate.

4. The system of claim 1, wherein the one or more optical components are located in a wake of the shedding vortices.

5. The system of claim 1, wherein each of the one or more optical components comprises one or more of a diffuser, a fly's eye lens and a lenslet array.

6. The system of claim 1, wherein the combination of the respective diameter of each of the one or more elongated fibers and the velocity of the air causes the one or more elongated fibers and the one or more optical components to each vibrate near a respective shedding frequency due to the shedding vortices.

7. The system of claim 1, wherein the combination of the respective diameter of each of the one or more elongated fibers and the velocity of the air have a Reynolds number of greater than about 50.

8. The system of claim 1, wherein the one or more elongated fibers are generally cylindrical and a Strouhal number is about 0.21.

9. The system of claim 1, wherein the respective diameter of each of the one or more elongated fibers is in a range of about 1 mm to about 3 mm, and the velocity is about equal to or greater than about 2 m/s.

10. The system of claim 1 wherein a temperature of the air is greater than about 15° C.

11. The system of claim 1, wherein boundary conditions of each of the one or more elongated fibers are configured to control an amplitude of vibration of each of the one or more elongated fibers.

12. The system of claim 11, further comprising at least two respective retainers for each of the one or more elongated fibers, wherein the boundary conditions comprise one or more of a length of each of the one or more elongated fibers between respective retainers for each of the one or more elongated fibers, and a tension of each of the one or more elongated fibers between the respective retainers.

13. The system of claim 11, wherein the amplitude of vibration of each of the one or more elongated fibers is about a same as the respective diameter of each of the one or more elongated fibers.

14. The system of claim 1, further comprising two respective retainers for retaining each of the one or more elongated fibers, and a respective ratio of a respective distance between each of the two respective retainers and a diameter of a respective elongated fiber is greater than about 2:1.

15. The system of claim 1, further comprising:
an array of elongated fibers including the one or more elongated fibers, arranged parallel with each other; and,
a plurality of optical components, including the one or more optical components, in a one-to-one relationship with the array of elongated fibers, the airflow device arranged to flow the air over, and about perpendicular to the array of elongated fibers.

16. The system of claim 15, further comprising a variable pressure device located between the airflow device and the array of elongated fibers, the variable pressure device configured to produce a gradient in the velocity of the air from the airflow device as the air flows over the array of elongated fibers, so that a frequency of vibration of each of the elongated fibers in the array, and each of the plurality of optical components, varies across the array.

17. The system of claim 16, wherein the variable pressure device comprises a variable pressure drop mesh.

18. The system of claim 1, wherein the airflow device comprises one or more of a fan, a cooling fan, and a blower.

19. The system of claim 1, further comprising a cabinet housing the airflow device and at least a portion of the one or more elongated fibers.

20. The system of claim 19, wherein the airflow device comprises a cooling fan for the cabinet.

21. The system of claim 20, further comprising an exhaust in the cabinet for flow past the one or more elongated fibers.

* * * * *